United States Patent
Piazza et al.

(10) Patent No.: US 9,565,717 B2
(45) Date of Patent: Feb. 7, 2017

(54) RECONFIGURABLE ANTENNAS AND CONFIGURATION SELECTION METHODS FOR AD-HOC NETWORKS

(75) Inventors: Daniele Piazza, Lodi (IT); John Kountouriotis, Philadelphia, PA (US); Michele D'Amico, Milan (IT); Kapil R. Dandekar, Philadelphia, PA (US); Prathaban Mookiah, San Diego, CA (US)

(73) Assignees: Drexel University, Philadelphia, PA (US); Politecnico Di Milano, Milan (IT)

( * ) Notice: Subject to any disclaimer, the term of this patent is extended or adjusted under 35 U.S.C. 154(b) by 693 days.

(21) Appl. No.: 13/634,381

(22) PCT Filed: Mar. 18, 2011

(86) PCT No.: PCT/US2011/029008
§ 371 (c)(1),
(2), (4) Date: Feb. 20, 2013

(87) PCT Pub. No.: WO2011/116289
PCT Pub. Date: Sep. 22, 2011

(65) Prior Publication Data
US 2013/0208608 A1    Aug. 15, 2013

Related U.S. Application Data

(60) Provisional application No. 61/315,148, filed on Mar. 18, 2010.

(51) Int. Cl.
G01R 31/08     (2006.01)
H04L 5/14       (2006.01)
(Continued)

(52) U.S. Cl.
CPC ............ *H04W 84/18* (2013.01); *H01Q 1/007* (2013.01); *H01Q 3/24* (2013.01); *H01Q 5/342* (2015.01);
(Continued)

(58) Field of Classification Search
CPC ....... H04W 84/18; H04W 88/06; H01Q 5/342; H01Q 3/24; H01Q 9/0435; H01Q 9/145; H04B 7/04
See application file for complete search history.

(56) References Cited

U.S. PATENT DOCUMENTS

| | | | |
|---|---|---|---|
| 6,417,807 B1 * | 7/2002 | Hsu | H01Q 1/38 333/262 |
| 2005/0123004 A1 * | 6/2005 | Lechleider | H04B 7/0413 370/529 |

(Continued)

FOREIGN PATENT DOCUMENTS

WO    WO 2008115881    *    9/2008    ............... H01Q 3/30

OTHER PUBLICATIONS

A Novel Single-Feed Circular Microchip Antewnna With Reconfigurable Polarization Capability, by Boyon Kim, Bo pan, Symeon Nikolaou, vol. 56, No. 3, publishes on Mar. 2008.*

(Continued)

*Primary Examiner* — Faruk Hamza
*Assistant Examiner* — Abu-Sayeed Haque
(74) *Attorney, Agent, or Firm* — Baker & Hostetler LLP

(57) ABSTRACT

Reconfigurable antennas in an ad-hoc network are provided where all nodes employ MIMO/SIMO/MISO communication techniques. Three types of reconfigurable antennas: Reconfigurable Printed Dipole Array (RPDA), Reconfigurable Circular Patch Antenna (RCPA) and Two-Port Reconfigurable CRLH Leaky Wave Antennas are used. The RPDA, RCPA and the CRLH Leaky Wave antennas have a (Continued)

different number of configurations as well as different degrees of pattern diversity between possible configurations. To effectively use these antennas in a network, the performance of centralized and decentralized antenna configuration selection schemes are quantified for reconfiguration at one or both link ends. The sum capacity of the network is used as a metric to quantify the performance of these antennas in measured and simulated network channels.

16 Claims, 7 Drawing Sheets

(51) Int. Cl.
| | | |
|---|---|---|
| H04L 12/28 | (2006.01) | |
| H04J 3/16 | (2006.01) | |
| H04W 84/18 | (2009.01) | |
| H01Q 1/00 | (2006.01) | |
| H01Q 3/24 | (2006.01) | |
| H01Q 9/04 | (2006.01) | |
| H01Q 9/14 | (2006.01) | |
| H01Q 9/28 | (2006.01) | |
| H01Q 21/08 | (2006.01) | |
| H01Q 5/342 | (2015.01) | |
| H04B 7/04 | (2006.01) | |
| H04W 88/06 | (2009.01) | |

(52) U.S. Cl.
CPC .......... *H01Q 9/0435* (2013.01); *H01Q 9/145* (2013.01); *H01Q 9/285* (2013.01); *H01Q 21/08* (2013.01); *H04B 7/04* (2013.01); *H04W 88/06* (2013.01)

(56) References Cited

U.S. PATENT DOCUMENTS

| | | | | |
|---|---|---|---|---|
| 2006/0025897 | A1* | 2/2006 | Shostak | B60C 23/005 701/1 |
| 2006/0222101 | A1* | 10/2006 | Cetiner | H01Q 21/061 375/267 |
| 2007/0025265 | A1* | 2/2007 | Porras | G06K 7/0008 370/252 |
| 2007/0179284 | A1* | 8/2007 | Herrmann | C12N 15/8286 530/370 |
| 2007/0279284 | A1* | 12/2007 | Karayil Thekkoott Narayanan | H04B 7/04 342/361 |
| 2008/0102760 | A1* | 5/2008 | McConnell | H04B 7/0617 455/73 |
| 2008/0150830 | A1 | 6/2008 | Pan et al. | |
| 2009/0209212 | A1 | 8/2009 | Cetiner et al. | |
| 2009/0225658 | A1* | 9/2009 | Rezvani | H04L 45/00 370/241 |
| 2010/0197261 | A1* | 8/2010 | Zibrik | H04B 7/0871 455/232.1 |

OTHER PUBLICATIONS

Bellofiore et al., "Smart antenna system analysis, integration and performance for mobile ad-hoc networks (MANETs)," IEEE Transactions on Antennas and Propagation, May 2002, 50(5), 571-581.

Bellofiore et al., "Smart-antenna system for mobile communication networks part 2: Beamforming and network throughput," IEEE Antennas and Propagation Magazine, Aug. 2002, 44(4), 106-114.

Hu et al., "MIMO ad hoc networks with spatial diversity: medium access control and saturation throughput," $43^{rd}$ IEEE Conference on Decision and Control (CDC), Dec. 17, 2004, vol. 3, 3301-3306.

Iltis et al., "Noncooperative iterative MMSE beamforming algorithms for ad hoc networks," IEEE Transactions on Communications, Apr. 2006, 54(4), 748-759.

International Patent Application No. PCT/US2011/029008: International Search Report and Written Opinion dated Jun. 7, 2011, 7 pages.

Jaikaeo et al., "Multicast communication in ad hoc networks with directional antennas," Proceedings of the $12^{th}$ International Conference on Computer Communications and Networks, ICCCN 2003, Oct. 20-22, 2003, 385-390.

Nasipuri et al., "A MAC protocol for mobile ad hoc networks using directional antennas," 2000 IEEE Wireless Communications and Networking Conference (WCNC), 2000, vol. 3, 1214-1219.

Ohira, T., "Emerging adaptive antenna techniques for wireless ad-hoc networks," ISCAS 2001, The 2001 IEEE International Symposium on Circuits and Systems, May 6-9, 2001, vol. 4, 858-861.

Park et al., "Improving throughput and fairness for MIMO ad hoc networks using antenna selection diversity," GLOBECOM '04, IEEE Global Telecommunications Conference, Nov. 29-Dec. 3, 2004, vol. 5, 3363-3367.

Piazza, D., "Reconfigurable Antennas for Adaptive MIMO Communication Systems," Drexel University Thesis, http://idea.library.drexel.edu/handle/1860/3037?mode=full, Jun. 2009, 236 pages.

Ramanathan et al., "Ad hoc networking with directional antennas: a complete system solution," IEEE Journal on Selected Areas in Communications, Mar. 2005, 23(3), 496-506.

Ramanathan, R., "On the performance of ad hoc networks with beamforming antennas," Proceedings of the 2001 ACM International Symposium on Mobile Ad Hoc Networking and Computing, 2001, 95-105.

\* cited by examiner

RECONFIGURABLE ANTENNAS AND CONFIGURATION SELECTION METHODS FOR AD-HOC NETWORKS

CROSS REFERENCE TO RELATED APPLICATIONS

This application is the National Stage of International Application No. PCT/US2011/029008, filed Mar. 18, 2011, which claims benefit of Provisional Application No. 61/315,148 filed Mar. 18, 2010, the disclosures of which are incorporated herein by reference in their entireties.

STATEMENT OF FEDERALLY SPONSORED RESEARCH

This invention was made with government support under research Grant Nos. #CNS-0322795, #CNS-0322797, and #ECS-0524200 awarded by the National Science Foundation. The United States Government has certain rights in the invention.

TECHNICAL FIELD

The present invention relates generally to the field of Ad-Hoc Networks. Specifically, the present invention relates to reconfigurable antennas and configuration selection methods for Ad-Hoc Networks.

BACKGROUND

Research in the area of ad-hoc networks has yielded important advances, notably in the field of physical layer techniques. In particular, a lot of effort has been spent in: i.) applying smart antennas and antenna diversity techniques to ad-hoc networks as explained in "Smart antenna system analysis, integration and performance for mobile ad-hoc networks (MANETs)," *IEEE Transactions on Antennas and Propagation*, vol. 50, no. 5, pp. 571-581, 2002 by S. Bellofiore, J. Foutz, R. Govindarajula, I. Bahceci, C. Balanis, A. Spanias, J. Capone, and T. Duman; in "Ad hoc networking with directional antennas: a complete system solution," *IEEE Journal on Selected Areas in Communications*, vol. 23, no. 3, pp. 496-506, 2005, by R. Ramanathan, J. Redi, C. Santivanez, D. Wiggins, and S. Polit; and in "Emerging adaptive antenna techniques for wireless ad-hoc networks," *ISCAS 2001. The 2001 IEEE International Symposium on Circuits and Systems*, vol. 4, pp. 858-861, 2001, by T. Ohira, ii.) developing medium access control protocols suitable for Multiple Input Multiple Output (MIMO) ad hoc networks as explained in "MIMO ad hoc networks with spatial diversity: medium access control and saturation throughput," vol. 3, 2004, pp. 3301-3306, 2004 43rd IEEE Conference on Decision and Control (CDC), by M. Hu and J. Zhang; in "Improving throughput and fairness for MIMO ad hoc networks using antenna selection diversity," *GLOBECOM '04. IEEE Global Telecommunications Conference*, vol. 5, pp. 3363-3367, 2004, by M. Park, J. Heath, R. W., and S. Nettles; and in "A MAC protocol for mobile ad hoc networks using directional antennas," *2000 IEEE Wireless Communications and Networking Conference*, vol. 3, pp. 1214-1219, 2000, by A. Nasipuri, S. Ye, J. You, and R. Hiromoto, and iii.) adaptive algorithms for antenna beamforming in ad hoc networks as described in "Noncooperative iterative MMSE beamforming algorithms for ad hoc networks," *IEEE Transactions on Communications*, vol. 54, no. 4, pp. 748-759, 2006, by R. Iltis, S. Kim, and D. Hoang; in "Smart-antenna system for mobile communication networks part 2: Beamforming and network throughput," *IEEE Antennas and Propagation Magazine*, vol. 44, no. 4, pp. 106-114, 2002, by S. Bellofiore, J. Foutz, C. Balanis, and A. Spanias, and in "On the performance of ad hoc networks with beamforming antennas," *Proceedings of the 2001 ACM International Symposium on Mobile Ad Hoc Networking and Computing*, pp. 95-105, 2001, by R. Ramanathan. Directional antennas, like phased arrays and switchable parasitic elements antennas, have been proposed as a solution to reduce the interference of adjacent nodes, maximizing overall network throughput in articles such as "Smart antenna system analysis, integration and performance for mobile ad-hoc networks (MANETs)," (citation above) "Emerging adaptive antenna techniques for wireless ad-hoc networks," (citation above) and "Multicast communication in ad hoc networks with directional antennas," *Proceedings 12th International Conference on Computer Communications and Networks*, pp. 385-390, 2003, by C. Jaikaeo and C. C. Shen. In order to further increase the network spectral efficiency, MIMO spatial multiplexing (SM) techniques and diversity techniques have been adopted. However, directional arrays and MIMO SM/diversity techniques cannot be integrated on compact portable devices, where the limited space available makes mounting multiple directional antennas difficult.

In order to overcome practical space limitations and merge the benefits of MIMO SM/diversity techniques with those of directional antennas, the inventors propose to adopt electrically reconfigurable antennas as a key element of MIMO/single-input-multiple-output (SIMO)/multiple-input-single-output (MISO) transceivers in ad-hoc networks. These antennas have been demonstrated to increase channel capacity while reducing the space occupation of the antenna on the communication device. While this previous work has focused on the performance of reconfigurable antennas in single link communications, there has been no published work on implementing and field testing a system that employs reconfigurable antennas in multi-link MIMO/SIMO/MISO ad hoc networks.

SUMMARY

The invention relates to a MIMO/SIMO/MISO ad-hoc network comprising at least one transmitter and/or receiver having at least one multi-element reconfigurable array of transceivers and a processor that processes software which implements a configuration selection method. The method is used to select an antenna configuration for at least one of the specified multi-element reconfigurable arrays. The antenna configuration is based on changes in the interference in a transmission over a transmission link including the antenna being configured, a transmission rate of the transmitter, a received signal strength of the receiver, an error vector magnitude of the receiver, a channel matrix of the receiver, and/or a packet error rate of the receiver or transmitter. The performance of the system is improved where the processor changes the antenna configuration of only the receiver in response to changes in the measured or estimated levels of the measured values over the transmission link. In the alternative, only the transmitting antenna can have its configuration changed. In this scenario, transmitters of different transmission links are allowed to change only after the levels of the values for the transmission link have adapted to the new antenna configuration at the transmitter of the transmission link. Reconfigurable circular patch antennas, two-port reconfigurable leaky wave antennas and/or reconfigurable printed dipole arrays can be used in MIMO/SIMO/MISO ad-hoc networks.

The method used to select an antenna configuration of at least one multi-element reconfigurable array of transceivers in the ad-hoc network includes a processor which selects the antenna configuration for at least one transmitter and/or a receiver of a transmission link in the ad-hoc network. The processor measures or estimates the interference, transmission rate, received signal strength, error vector magnitude, channel matrix, and/or packet error rate of the transmission link. Finally, an antenna configuration is selected for the other transmission links in the ad-hoc network based on the measured or estimated interference, transmission rate, received signal strength, error vector magnitude, channel matrix, and/or packet error rate using the first selected antenna configuration. The process of measuring and selecting is done for every transmission link in the ad-hoc network to allow every transmitter to respond to the new levels caused by the transmit configuration of the first transmitter in the link. On the other hand, antenna configurations can be done for receivers only in response to changes in measured or estimated levels in the transmission link.

In exemplary embodiments of the invention the software processed by the processor may implement a centralized configuration selection process that has knowledge of part or all communication and interference channels in the ad-hoc network and selects the antenna configuration that optimizes the sum capacity of the ad-hoc network, the sum throughput of the ad-hoc network, and/or the error rate of the ad-hoc network or a distributed configuration selection process that selects the antenna configuration using link channel and interference noise plus a noise covariance matrix, a transmission rate, a received signal strength, an error vector magnitude, a channel matrix, and/or a packet error rate for the transmission link including the antenna being configured by optimizing the link capacity, link throughput, or the link packet error rate of the transmission link. Also, an antenna configuration at only one end of the transmission link may be changed and an end of the transmission link that is not changed is restricted to use the most radiation efficient antenna configuration at all times.

BRIEF DESCRIPTION OF THE DRAWINGS

The foregoing and other beneficial features and advantages of the invention will become apparent from the following detailed description in connection with the attached figures, of which.

DETAILED DESCRIPTION OF ILLUSTRATIVE EMBODIMENTS

Figure 1:
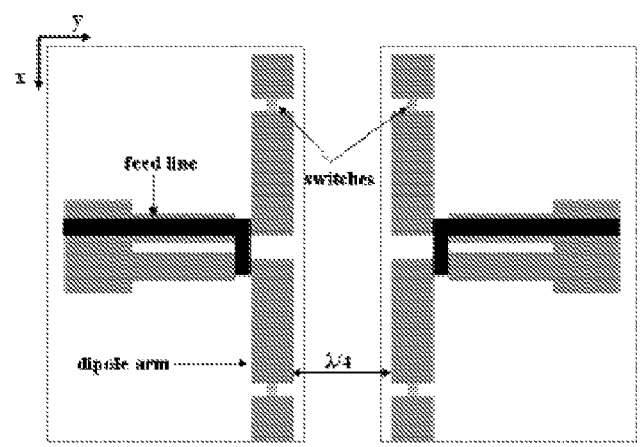
FIG. 1 illustrates a schematic of the Reconfigurable Printed Dipole Array in accordance with the invention.

The present invention may be understood more readily by reference to the following detailed description taken in connection with the accompanying figures and examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods and software for implementing such methods.

A detailed description of illustrative embodiments of the present invention will now be described with reference to FIGS. 1-14. Although this description provides a detailed example of possible implementations of the present invention, it should be noted that these details are intended to be exemplary and in no way delimit the scope of the invention.

The description below quantifies the benefits achievable with reconfigurable antennas in MIMO/SIMO/MISO ad-hoc networks, while also investigating antenna configuration selection schemes at each node. In an exemplary embodiment, the antenna configuration selection schemes are implemented in software implemented on one or more network processors. In a network scenario, the antenna configuration selection algorithm for a single link not only seeks the configuration combination (i.e., the configuration at the receiver and the configuration at the transmitter) that will provide a "rich" channel between the receiver and the transmitter, but will also aim to mitigate the interference that the link is suffering from. This configuration selection process is made more complex by the fact that when the antenna configuration at a transmitter is modified, it changes the interference seen by the other links in the network. While directional antennas can perform interference mitigation by estimating the direction of the incoming signals at the receiver, it may be shown that reconfigurable MIMO/SIMO/MISO antennas can achieve a similar result, with lower system complexity, by only estimating the channel matrix.

In order to maximize network sum capacity without a centralized controller, a distributed selection algorithm is described below that can be used to efficiently select the antenna configuration at each node. The performance of this distributed selection scheme is compared to that of an ideal centralized approach that uses an exhaustive search process to assign the optimal antenna configuration to every node. It is assumed for both centralized and distributed antenna configuration control that all transmitters make use of the equal power allocation scheme proposed which requires no channel feedback from the receiver to the transmitter.

The sum network capacity that can be achieved with MIMO/SIMO/MISO reconfigurable antennas for different network topologies through channel measurements and electromagnetic ray tracing simulations conducted in an indoor environment are determined. In an exemplary embodiment, two prototype electrically reconfigurable antenna architectures in a 2×2 MIMO system employing SM are considered: i.) a Reconfigurable Printed Dipole Array (RPDA) that makes use of two reconfigurable length dipole antennas and ii.) a Reconfigurable Circular Patch Antenna (RCPA) that makes use of a single variable-radius circular patch antenna with two feedpoints. As explained below, parameters like the number of antenna configurations, the spatial orthogonality between the array elements, and the level of antenna radiation efficiency can be used to predict the achievable performance with a particular reconfigurable antenna in an ad-hoc network.

I. Reconfigurable Antenna Architectures

Two different compact pattern reconfigurable antennas, intended to be used as a building block of MIMO/SIMO/MISO systems in ad hoc networks, are presented. The following antennas were all designed to operate in the 2:4-2:5 GHz frequency band typical of an 802:11-like MIMO network. The performance of each multi-element reconfigurable array of transceivers is quantified using radiation patterns, radiation pattern spatial correlation, and radiation efficiency.

The level of diversity between the patterns generated at the two ports of the array, as well as between the patterns generated at the same port for different configurations of the array, is estimated through the spatial correlation coefficient value. Assuming a rich scattering environment, the spatial correlation coefficient, $\rho_{j,k,l,m}$, is defined as:

$$\rho_{j,k,l,m} = \frac{\int_{4\pi} E_{j,k}(\Omega) E^*_{l,m}(\Omega) d\Omega}{[\int_{4\pi} |E_{j,k}(\Omega)|^2 d\Omega \int_{4\pi} |E_{l,m}(\Omega)|^2 d\Omega]^{1/2}} \quad (1)$$

where j and l define the array port and k and m the antenna configuration at the port j and l respectively. $E_{j,k}(\Omega)$ is the radiation pattern of the configuration k at port j over the solid angle $\Omega=(\phi, \theta)$ and $\langle * \rangle$ is the transpose operator.

Radiation pattern spatial correlation coefficients can be used as a first estimate of the performance of the reconfigurable antenna designs. In particular, the spatial correlation between radiation patterns excited at two different ports of the antenna array gives an indication of how much decorrelated are the signals collected at the two multi-element reconfigurable array elements. A lower correlation coefficient between the two ports will lead to lower correlation between the communication channels from these ports, resulting in higher capacity. Similarly, spatial correlation coefficients relative to radiation patterns generated at the same port for different configurations give an indication of the increment in system diversity achievable using reconfigurable antennas with respect to standard non reconfigurable antenna systems. The higher the diversity between different configurations, the higher the overall system diversity and the higher the achievable channel capacity.

Radiation efficiency is also an important performance measure for reconfigurable antennas. In particular, for a fixed transmitter power, the higher the radiation efficiency, the greater the received signal power and channel capacity.

Reconfigurable Printed Dipole Array

The Reconfigurable Printed Dipole Array (RPDA) consists of two microstrip dipoles separated by a distance of a quarter wavelength. The active elements in the multi-element reconfigurable array can be electrically reconfigured in length using PIN diode switches. Two configurations are defined for each dipole: one in which both switches are activated ("long" configuration) and another in which they are deactivated ("short" configuration). Thus, four different configurations can be defined for the RPDA: both antennas "long" (l-l), both antennas "short" (s-s), one antenna "short" and the other "long" (s-l) and vice versa (l-s). A schematic of the structure of the RPDA is depicted in FIG. 1.

Figure 2:
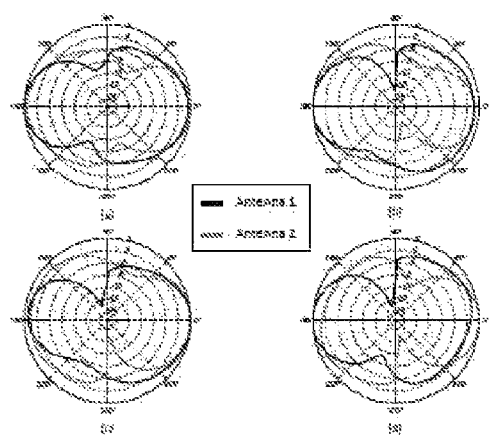
FIG. 2 illustrates a radiation pattern (in dB) in the azimuthal plane of the two printed dipoles separated by $\lambda/4$ in all the configurations for an operation frequency of 2:48 GHz: (a) antenna 1 "short", antenna 2 "short"; (b) antenna 1 "long", antenna 2 "short"; (c) antenna 1 "short", antenna 2 "long"; (d) antenna 1 "long", antenna 2 "long".

The setting of the switches results in different geometries of the antenna and, consequently, in different levels of inter-element mutual coupling and far-field radiation patterns. Four different pairs of radiation patterns can then be produced. FIG. 2 shows these radiation patterns in the azimuthal plane.

Table I(A) shows the values of spatial correlation between the measured azimuthal patterns generated at the two ports of the RPDA, while Table I(C) shows the values of correlation between the measured azimuthal patterns generated at the same port for all the array configurations. Table I(A) shows that the correlation values between radiation patterns at the two ports of the array are small enough for all the configurations (≤0:7) to provide significant diversity gain. In contrast, Table I(C) shows that the level of diversity between the different configurations is not as high ($\rho_{1,k,1,m}$>0.8) and is much less than that of the RCPA discussed below.

The measured radiation efficiency for each array configuration is given in Table I(B). It should be noted from this table that there is an imbalance in the radiation efficiency for the different configurations: "short-short" is the most efficient antenna configuration while "long-long" is the least efficient.

TABLE I (A) SPATIAL CORRELATION BETWEEN PATTERNS GENERATED AT TWO DIFFERENT PORTS OF THE RPDA, (B) MEASURED RADIATION EFFICIENCY OF THE RPDA AND (C) SPATIAL CORRELATION BETWEEN PATTERNS GENERATED AT THE SAME PORT OF THE RPDA

| (A) | | | |
| --- | --- | --- | --- |
| short-short | long-short | short-long | long-long |
| 0.43 | 0.28 | 0.28 | 0.31 |

| (B) | |
| --- | --- |
| | Antenna 1 | Antenna 2 |
| short-short | 84% | 84% |
| short-long | 77% | 48% |

TABLE I-continued (A) SPATIAL CORRELATION BETWEEN PATTERNS GENERATED AT TWO DIFFERENT PORTS OF THE RPDA, (B) MEASURED RADIATION EFFICIENCY OF THE RPDA AND (C) SPATIAL CORRELATION BETWEEN PATTERNS GENERATED AT THE SAME PORT OF THE RPDA

| | | |
|---|---|---|
| long-short | 48% | 77% |
| long-long | 52% | 52% |

(C)

| | $E_{1,s\text{-}s}$ | $E_{1,s\text{-}l}$ | $E_{1,l\text{-}s}$ | $E_{1,l\text{-}l}$ |
|---|---|---|---|---|
| $E_{1,s\text{-}s}$ | 1 | 0.87 | 0.94 | 0.9 |
| $E_{1,s\text{-}l}$ | 0.87 | 1 | 0.9 | 0.93 |
| $E_{1,l\text{-}s}$ | 0.94 | 0.9 | 1 | 0.93 |
| $E_{1,s\text{-}l}$ | 0.9 | 0.93 | 0.93 | 1 |

Reconfigurable Circular Patch Antenna

Figure 3:
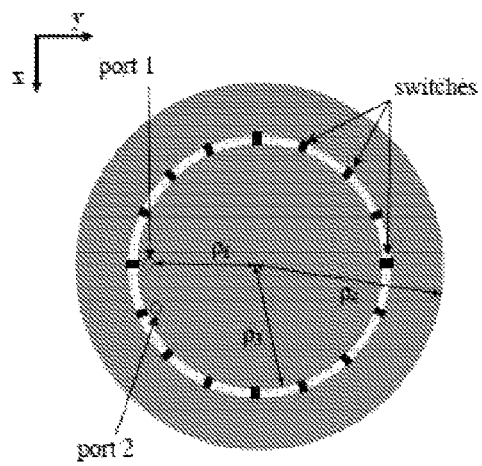
FIG. 3 illustrates a schematic of a Reconfigurable Circular Patch Antenna (RCPA).

The Reconfigurable Circular Patch Antenna (RCPA), consists of a circular patch whose radius can be electrically varied by turning all the switches on and off simultaneously. Thus, the RCPA has two configurations: one in which all the switches are turned off and the electromagnetic mode $TM_{31}$ is excited ("Mode 3" configuration) and another in which they are turned on and the electromagnetic mode $TM_{41}$ is excited ("Mode 4" configuration). The structure of the RCPA is shown in FIG. 3. The antenna is fed through two ports placed on the antenna structure such that: i.) the radiation patterns excited simultaneously at the two ports are spatially orthogonal to each other and ii.) the port isolation is higher than 20 dB. The design is ideal for compact MIMO systems in that two channels can be achieved using a single physical antenna.

Figure 4:
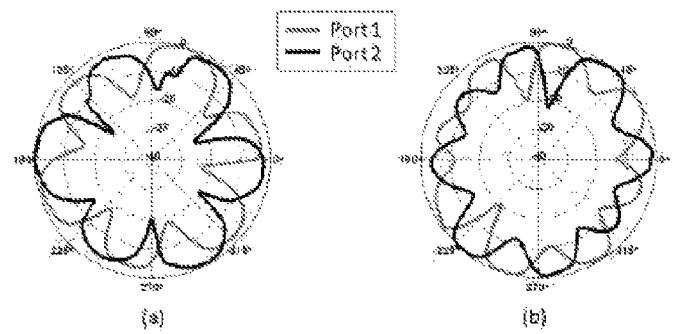
FIG. 4 illustrates a pattern (in dB) in the azimuthal plane at the two ports of the RCPA in all its configurations for an operation frequency of 2:48 GHz:(a) port 1 "Mode 3", port 2 "Mode 3"; (b) port 1 "Mode 4", port 2 "Mode 4".

The measured radiation patterns of the RCPA are shown in FIG. 4 for both configurations in the azimuthal plane. FIG. 4 shows that the radiation patterns excited by "Mode 3" and "Mode 4" configurations are significantly different, resulting in a large amount of pattern diversity.

The spatial correlation coefficient value between azimuthal patterns generated at two antenna ports, and between azimuthal patterns of different configurations generated at the same port, are calculated according to (1) and reported in Tables II(A) and II(C) respectively. From Table II(A) it can be seen that the patterns generated at the two ports of the RCPA are spatially orthogonal for both configurations. Moreover Table II(C) shows the very high level of diversity ($\rho_{1,k,1,m}$=0.2) existing between the two configurations of the RCPA.

The measured antenna radiation efficiencies are reported in Table II(B). This antenna suffers of low radiation efficiency because higher order modes are excited on a lossy substrate (FR4 with tan δ=0.02). "Mode 3" exhibits higher radiation efficiency than "mode 4" configuration because lower order modes are more efficient than higher order modes and because no power is lost in the switches when "mode 3" is active.

TABLE II (A) SPATIAL CORRELATION BETWEEN PATTERNS GENERATED AT TWO DIFFERENT PORTS OF THE RCPA, (B) MEASURED RADIATION EFFICIENCY OF THE RCPA AND (C) SPATIAL CORRELATION BETWEEN PATTERNS GENERATED AT THE SAME PORT OF THE RCPA (A)

| | Mode 3 | Mode 4 |
|---|---|---|
| | 0.06 | 0.18 |

(B)

| | Port 1 | Port 2 |
|---|---|---|
| Mode 3 | 21% | 17% |
| Mode 4 | 6% | 5% |

(C)

| | $E_{1,mode3}$ | $E_{1,mode4}$ |
|---|---|---|
| $E_{1,mode3}$ | 1 | 0.2 |
| $E_{1,mode4}$ | 0.2 | 1 |

Comparison of RCPA with RPDA

A comparison between the RPDA and the RCPA shows that, based on the results of Tables I(A), I(C), II(A), and II(C), in a rich scattered environment, the RCPA provides a higher degree of diversity for all its configurations (and among the different configurations) with respect to the RPDA. Therefore the RCPA allows for higher decorrelation between signals at the receiver and it provides higher system diversity. In contrast, the RPDA allows for switching between double the number of radiation patterns offered by the RCPA. Thus, the RPDA and RCPA can be viewed as representing two different "philosophies" for using reconfigurable antennas in wireless communications systems: i.) substantial changes in radiation pattern (e.g., RCPA), and ii.) a large number of radiation pattern states (e.g., RPDA).

Both antenna designs allow for full radiation coverage in the azimuth plane. Therefore, a good signal reception is guaranteed independently from the relative orientation of the transmitter and the receiver.

Finally, the RPDA is characterized by higher radiation efficiency than the RCPA. Thus the RPDA is expected to collect a stronger signal than the RCPA. This could lead to higher values of channel capacity because of a stronger received SNR, but it could also lead to stronger co-channel interference.

II. System Model and Notation

It is assumed that the ad-hoc network consists of L co-located links which interfere with each other. All links are single hop (i.e., no node is used for relaying) and all transmit-receive pairs are pre-determined. The following notation will be used hereafter. $H_{i_{rc},j_{tc}}$ denotes the channel between the receiver of link i and the transmitter of link j, which is a function of the receive configuration of link i($i_{rc}$) and the transmit configuration of link j($j_{tc}$). In the case of the RPDA, $1_{rc}$, $1_{tc} \in [1, 4]$, and for the RCPA, lrc; $1_{rc}$, $1_{tc} \in [1, 2]$. $x_i$ is the signal vector of link i, which results in the power covariance matrix of link i, $Q_1$ as $Q_i = E\{x_i x_i^H\}$. Operation (.)H denotes the conjugate transpose. Using this notation and assuming a flat fading channel, the input-output relationship for link l can be written as:

$$y_i = H_{lrc,ltc}x_l + \sum_{i \in \mathcal{L}\backslash l} H_{lrc,itc}x_i + n \quad (2)$$

$$\sum_{i \in \mathcal{L}\backslash l} H_{lrc,itc}x_i + n$$

is the interference plus noise, which results in an interference plus noise covariance matrix for link l:

$$R_l = \sigma^2 I + \sum_{i \in \mathcal{L}\backslash l} H_{lrc,itc} Q_i H_{lrc,itc}^H.$$

For the above equation, the assumption was made that the noise has power $\sigma_2$ and is independent across receive elements. Vector c is an 1×2L vector that contains the configurations for all links, (i.e., $c=[1_{rc}, 1_{tc}, 2_{rc}, 2_{tc}, \ldots, L_{rc}, L_{tc}]$). Notice also that the interference plus noise covariance matrix is a function of the receive configuration of the link and the transmit configurations used in the network. It is also assumed that the single type of reconfigurable antenna, RCPA or RPDA, is used by all nodes in the network.

The power allocation strategy considered herein is the Equal Power Allocation technique. Although the Equal Power Allocation technique was used in the following example other power allocation strategies would work also. It is the simplest MIMO transmission strategy, proved to be optimal in the case where there is no channel feedback to the transmitter. This strategy consists of splitting the total available power in a node equally among the transmit antenna elements and assigning each element an independent symbol to transmit. In this case, x has $N_T$ non-zero elements, while Q is always a diagonal matrix with diagonal elements equal to $$\frac{P_T}{N_T}$$

each. For the equal rower Allocation technique, the capacity of link l becomes:

$$C_l = \log_2\left(\det\left(I + \frac{P_T}{\sigma^2 N_T} H_{lrc,ltc} H_{lrc,ltc}^H R_l^{-1}\right)\right) \quad (3)$$

where $$R_l = I + \sum_{i \in \mathcal{L}\backslash l} \frac{P_T}{\sigma^2 N_T} H_{lrc,itc} H_{lrc,itc}^H$$

is the interference plus noise covariance matrix.

To quantify the performance of the different types of reconfigurable antennas in an ad-hoc network, the sum capacity of the network is used:

$$C = \sum_{l \in \mathcal{L}} \log_2\left(\det\left(I + \frac{P_T}{\sigma^2 N_T} H_{lrc,ltc} H_{lrc,ltc}^H R_l^{-1}\right)\right) \quad (4)$$

Closed loop MIMO power allocation algorithms that make use of channel feedback information from the receiver to the transmitter could also be implemented to improve link and network capacity. However, these algorithms become more complex when reconfigurable antennas are used. In particular, channel feedback information would have to be provided for all the different antenna configurations used by the transmitter and receiver. Closed loop algorithms become even more challenging in a network using reconfigurable antennas because knowledge of the interference state of the network would be needed. This interference also depends on the specific antenna configurations used by all the transmitters in the network so it would be difficult to keep all channel and interference estimates current.

III. Antenna Configuration Selection Methods

Consider three different cases for using reconfigurable antennas in the network. In the first case, called Double-Side Reconfigurable Antennas (DSRA), both the receiver and the transmitter of any given link can adapt its configuration. For the other two cases, either the link receiver or the link transmitter alone is allowed to switch its configuration. These situations are referred to as Receiver-Side Reconfigurable Array (RXRA) and Transmitter-Side Reconfigurable Array (TXRA), respectively. The side of the link that is not allowed to change configuration is restricted to use the most efficient configuration at all times (i.e., the short-short configuration for the RPDA case, and mode 2 for RCPA). For these three different cases, consider centralized and a distributed configuration selection schemes using circular patch antennas, two-port reconfigurable leaky wave antennas, and printed dipole antennas, as discussed below.

Centralized Configuration Selection Technique

To provide an upper bound on the performance of reconfigurable antennas in ad-hoc networks, consider the use of a powerful centralized controller that has instantaneous knowledge of part or all communication and interference channels (e.g., $H_{l_{rc},i_{tc}}$, $\forall l, i \in \mathcal{L}$). This controller is allowed to control the state of all reconfigurable antennas in the network to optimize the sum capacity given in the prior equation. Specifically, the central controller solves the following optimization problem:

$$\max_c\left(\sum_{l \in \mathcal{L}} \log_2\left(\det\left(I + \frac{P_T}{\sigma^2 N_T} H_{lrc,ltc} H_{lrc,ltc}^H R_l^{-1}\right)\right)\right) \quad (5)$$

where c is an 1×2L is a vector that contains the configurations for each node. To solve this optimization problem, the centralized controller conducts an exhaustive search over all possible antenna configurations in all network nodes. The central controller also may optimize the sum throughput and/or the error rate of the ad-hoc network.

Distributed Configuration Selection Technique

For a more practical approach to configuration selection in MIMO ad-hoc networks making use of reconfigurable antennas, a distributed configuration technique is also considered. In this technique, each link makes its own configuration selection using only the link channel ($H_{l_{rc},l_{tc}}$) and interference plus noise covariance matrix $R_l$. The assumption of such locally available channel information is commonly used in ad-hoc networks. Since each link does not have information about other channels in the network, the antenna configuration decision cannot be geared towards maximizing network sum capacity. Instead, each transmitter performs configuration selection to optimize individual link capacity, link throughput, or the link packet error rate of the transmission link. Mathematically, link l solves the following optimization problem:

$$\max_{rc,tc}\left(\log_2\left(\det\left(I + \frac{P_T}{\sigma^2 N_T} H_{l_{rc},l_{tc}} H_{l_{rc},l_{tc}}^H R_l^{-1}\right)\right)\right) \quad (6)$$

where $R_l$ continues to depend on the transmit configuration of all the other links and the receive configuration of link l. However, a change in transmit configuration for a particular link leads to a different amount of interference encountered by the other links. These other links, in turn, will have to respond to this change in interference levels by choosing their antenna configurations to maximize their own capacity. Thus, the Distributed technique is an iterative procedure where each link continually updates its configuration selection in response to changes in the interference. The procedure is very similar to the Iterative Waterfilling algorithm, but instead of using different power allocation matrices to respond to changes in the interference, the nodes will use different antenna configuration combinations. The distributed configuration selection process may also select the antenna configuration using transmission rate, received signal strength, error vector magnitude, channel matrix, and/or error packet rate for the transmission link including the antenna being configured.

Single Side Reconfigurable Antennas

As mentioned previously, the inventors individually considered situations with reconfigurable antennas at both ends of the link (DSRA), at the transmitter only (TXRA), and at the receiver only (RXRA). Looking at Equation 3, it is apparent that a link's capacity is a function of receive and transmit configurations of it, as well as the transmit configurations of the other links (through the interference plus noise covariance matrix R) that co-exist in the network. In other words, when a link changes its receive configuration, it affects only its own capacity, while when a link changes its transmit configuration it does not only affect its own capacity but the capacities of all the other links as well. So, in the case of distributed antenna configuration selection, when a link is allowed to change its transmit configuration there is the need for an iterative procedure, so as to allow for the other links to respond to the new interference levels caused by the change in the transmit configuration of one of them. But when only the receive configurations are allowed to change, a change of the configuration in one link will only affect this link and thus it is no longer needed to have iterations.

Apart from the inherit iterative nature of the configuration selection schemes which also involve changing the transmit configuration, allowing configuration changes in the receive side only has another positive merit: it removes the requirement of having to implement a feed-back loop needed for the receiver to notify the transmitter on which configuration it should be using. These two properties of the configuration selection scheme at the receiver only (not iterative and no need for feed-back) make the RXRA scheme much more appealing for a practical implementation due to its simplicity and its much less overhead.

The RXRA technique is also desirable in that the Distributed and Centralized schemes become equivalent; when a link maximizes its own capacity by changing reconfigurable antennas only at the receiver, it also maximizes network sum capacity. This is again true via the fact that a change in the receive configuration of a link will only affect the capacity of this link, while leaving the capacities of the rest of the links in the network the same. Distributed and Centralized schemes are not necessarily equivalent when reconfigurable antennas are used at the transmitters of ad-hoc network links as the "selfish" choice that each node makes to maximize its own capacity in the distributed schemes, is no longer guaranteed to have a positive impact on the overall network sum capacity, as it is achieved with the centralized schemes.

Configuration adaptation at a single side of the link also provides a smaller search space for the Centralized technique and less channel training for the Distributed technique. For example, in the case of RPDAs where there are four configurations available, a link has 16 different configuration combinations to choose from with DSRA. However, this number decreases to four configuration combinations for TXRA and RXRA. This difference in the number of available configurations, while reducing the degrees of freedom the network has, would also require less training. Less channel training may have a positive impact on the performance when the channel estimation errors are taken into account, depending on the total number of configuration combinations that need to be considered.

When assuming configuration adaptation at only one side of the link, it is still assumed that the other link end uses a reconfigurable antenna, since in an ad-hoc network any node can be either a receiver or a transmitter. However, the side that is not allowed to switch its configuration is restricted to use the most radiation efficient configuration at all times.

IV. Data Collection

The performance that can be achieved, in terms of sum network capacity, combining reconfigurable antennas and the techniques described above, was investigated through field measurements and electromagnetic ray tracing simulations in an indoor environment.

Measurement Setup

Figure 5:
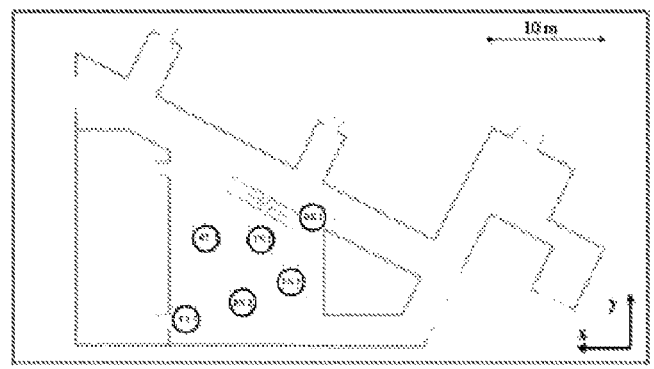
FIG. 5 illustrates a measured topology using the illustrated arrays.

The network topology where measurements were made is shown in FIG. 5. For the measurements the HYDRA Software Defined Radio platform was used. This platform was also used for the evaluation of reconfigurable antennas in single link scenarios. The platform is a 2×2 MIMO platform that operates in the 2.4 GHz band using OFDM with 64 subcarriers (52 are carrying data).

In FIG. 5, three nodes (RX1 to RX3) with two receive elements each acted as receivers and three nodes (TX1 to TX3) with two transmit elements each acted as transmitters, so as to create 6 different network topologies, by perturbating the intended receiver/transmitter pairs. To capture small scale fading effects, the receive elements were placed on a robotic antenna positioner and were moved at 40 different positions at displacements of λ/10 along the y-axis for RX1 and RX2 and along the x-axis for RX3. At each position, 100 noisy channel estimates were captured and averaged for each subcarrier, so as to get the channel response between each receiver-transmitter pair. Based on these estimated channels for each of the positions, the sum network capacity was calculated as discussed above. In this way, 240 samples were acquired (6 network topologies with 40 samples each) of sum network capacities per subcarrier for each of the employed antennas and each configuration selection scheme. The response at each subcarrier was treated as an independent narrow band channel and for each location, the sum network capacity was averaged over these 52 subcarriers.

The acquired channels were normalized with a common parameter, so that $$\max_{l,i \in \mathcal{L}, rc, tc} E\left\{\sum_{s=1}^{52} \|H^s_{l_{rc}, i_{tc}}\|^2_F\right\} = 4 \circ 52,$$

with the expectation over the 40 positions and subcarrier index, s. With this normalization procedure, it was possible to remove path loss effects from the strongest channel, while maintaining the relative strength of the channels between the different configurations and between different receiver-transmitter pairs. This normalization was performed on a per reconfigurable antenna basis (i.e., one normalization parameter for the RCPA and one for the RPDA) because of the large difference in radiation efficiency between the two antenna architectures.

Simulation Setup

The simulated channels were acquired via numerical computation using an electromagnetic ray tracer, FASANT. FASANT is a deterministic ray tracing program based on geometric optics and the uniform theory of diffraction. A 3D model of the hallway of the 3rd floor of the Bossone Research building on Drexel University campus was simulated as the geometry input of FASANT.

The 3D radiation patterns of the three antennas presented above were used in the ray tracing simulation both at the receiver and at the transmitter in a 2×2 MIMO ad-hoc network. These patterns were acquired by measurements in an anechoic chamber. Note that the orientation of the reconfigurable antennas was selected such that the maximum degree of pattern diversity between the patterns of different antenna configurations was in the azimuthal plane.

The simulations were conducted by transmitting a single tone at 2:484 GHz to obtain the values of the entries of the channel matrices, H, for all channel and interference matrices. The extracted channel matrices were then used to calculate the sum network capacity for each of the methods discussed above.

The simulated channels, as in the measurement case, were normalized with a common parameter, so that $$\max_{l,i \in \mathcal{L}, rc, ic} E\{\|H^s_{l_{rc}, i_{tc}}\|^2_F\} = 4,$$

with the expectation over the 40 positions. Again, like measurements, one normalization factor was used for the RPDA and another normalization factor was used for the RCPA.

V. Results

For the following results, it was assumed that $$\frac{P_T}{\sigma^2} = 100 \text{ for all the nodes.}$$

The maximum number of iterations allowed for the Distributed TXRA and DSRA techniques was 10. If convergence was still not achieved after 10 iterations, the sum capacity achieved at the $10^{th}$ iteration was used in forming the CDFs that appear below. However, when the Distributed TXRA and DSRA techniques did not converge, the iteration count was not included in the calculation of the average number of iterations discussed further below.

Results for the Reconfigurable Circular Patch Array

Figure 6:
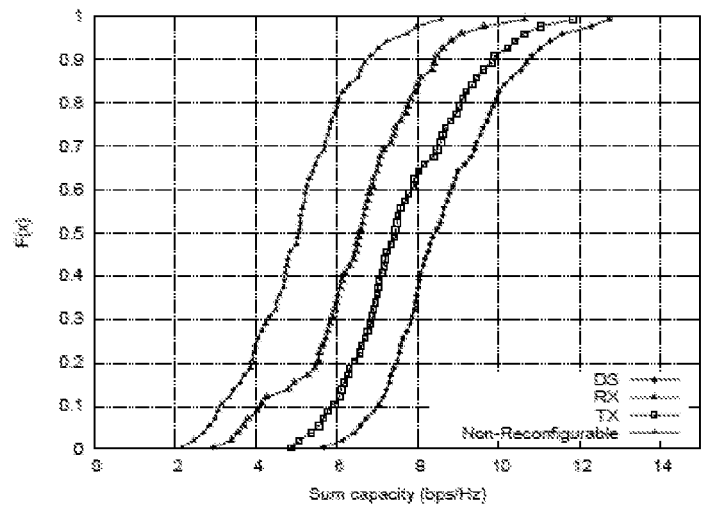
FIG. 6 illustrates a CDF of Sum Capacity for RCPA with Equal Power Allocation-Centralized Configuration Selection (Measurements).
Figure 7:
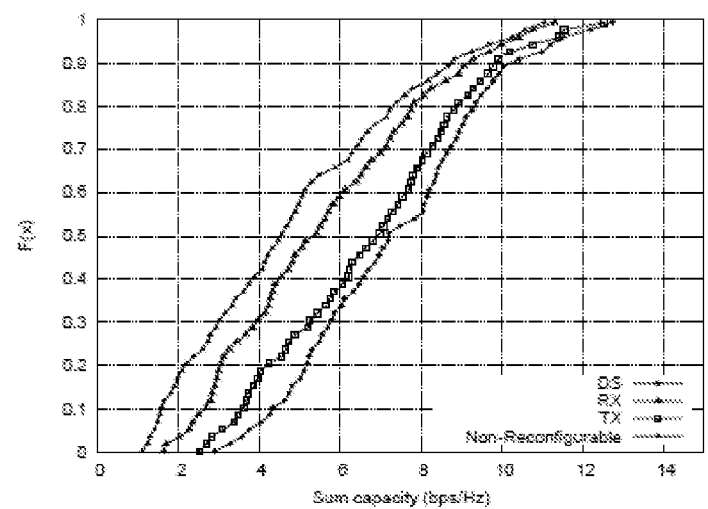
FIG. 7 illustrates a CDF of Sum Capacity for RCPA with Equal Power Allocation-Centralized Configuration Selection (Simulation).
Figure 8:
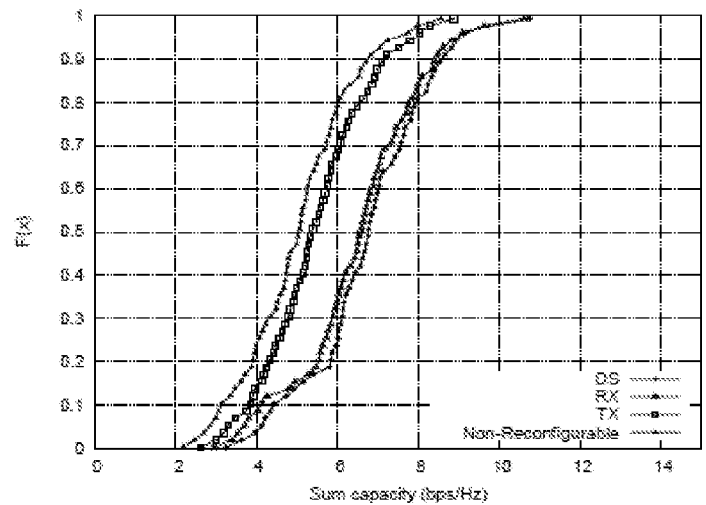
FIG. 8 illustrates a CDF of Sum Capacity for RCPA with Equal Power Allocation-Distributed Configuration Selection (Measurements).
Figure 9:
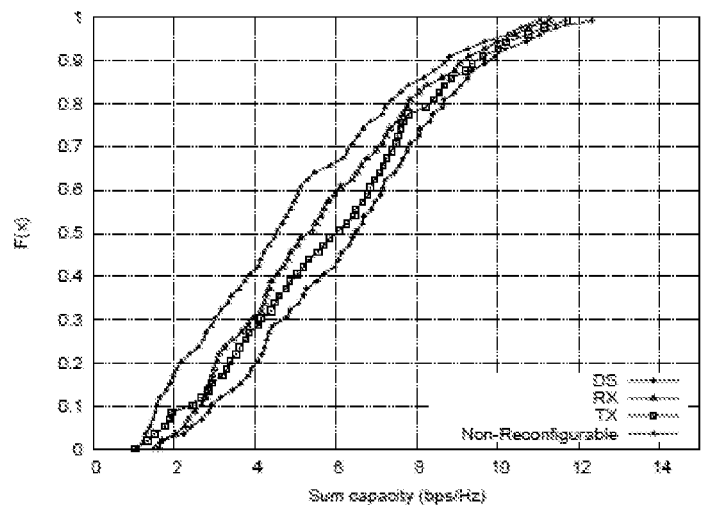
FIG. 9 illustrates a CDF of Sum Capacity for RCPA with Equal Power Allocation-Distributed Configuration Selection (Simulation).
Figure 10:
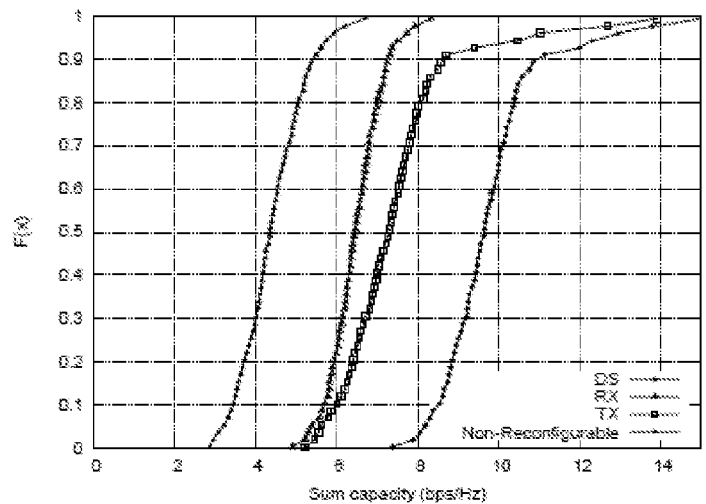
FIG. 10 illustrates a CDF of Sum Capacity for RPDA with Equal Power Allocation-Centralized Configuration Selection (Measurements).
Figure 11:
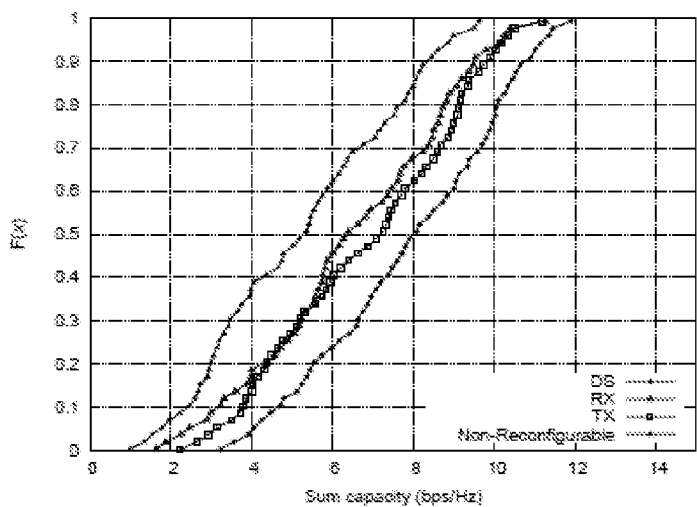
FIG. 11 illustrates a CDF of Sum Capacity for RPDA with Equal Power Allocation-Centralized Configuration Selection (Simulation).
Figure 12:
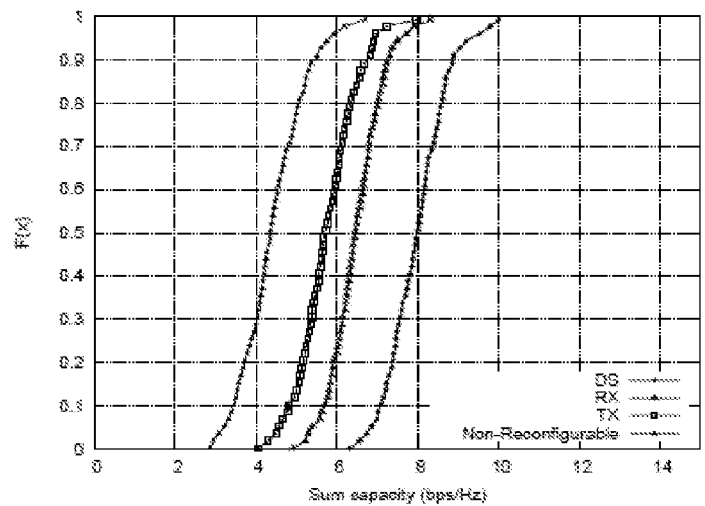
FIG. 12 illustrates a CDF of Sum Capacity for RPDA with Equal Power Allocation-Distributed Configuration Selection (Measurements).
Figure 13:
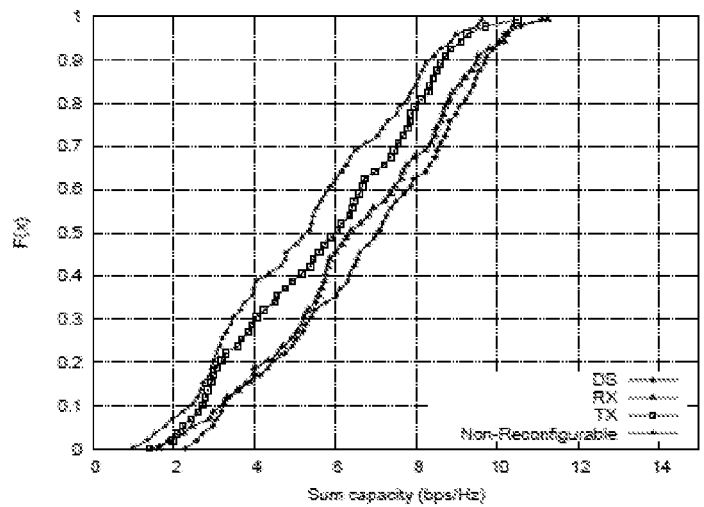
FIG. 13 illustrates a CDF of Sum Capacity for RPDA with Equal Power Allocation-Distributed Configuration Selection (Simulation).

1) Sum Capacity Results: In FIGS. 6 and 7, the CDFs of the network sum capacity using the Centralized configuration selection methods are plotted for the measured and simulated results respectively. The CDFs of sum capacity resulting from the Distributed configuration selection schemes appear in FIG. 8 for the measurement results and in FIG. 9 for the simulation results. Both the simulation and measurement CDFs show that the increases in sum capacity, as compared to the case where all nodes are equipped with non-reconfigurable Mode 3 circular patch antennas, are considerable. For easier comparison, the expected sum capacity resulting from these CDFs along with the capacity percentage increase of using reconfigurable antennas, are summarized in Table III. From these tables, the measured sum capacity increases are greater than those predicted from the simulations. In particular, for the Centralized DSRA scheme, simulations show an increase of around 50% when using reconfigurable antennas, whereas for the measurements the percentage increase is around 75%. Note that both simulations and measurements show that relatively large sum capacity increases can be expected—the minimum increase is 8:70% for the measured Distributed TXRA case, while for the more appealing Distributed RXRA technique, the percentage increase is 14% for the simulations and 31% for the measurements. The trends in selection technique performance are generally the same for both measured and simulated results. However, in the Distributed RXRA and TXRA techniques, the trends are reversed: in the measurements Distributed RXRA outperforms Distributed TXRA, while in simulations the reverse is true.

TABLE III

RCPA MEAN SUM NETWORK CAPACITY

| Selection Technique | Mean Sum Capacity (bps/Hz) | % Increase vs. Non-Reconfigurable |
|---|---|---|
| Simulations | | |
| DSRA - Distributed | 6.40 | 30.77 |
| RXRA - Distributed | 5.60 | 14.42 |
| TXRA - Distributed | 5.91 | 20.93 |
| DSRA - Centralized | 7.33 | 49.90 |
| RXRA - Centralized | 5.60 | 14.42 |
| TXRA - Centralized | 6.79 | 38.80 |
| Non-Reconfigurable | 4.89 | 0 |
| Measurements | | |
| DSRA - Distributed | 6.84 | 35.51 |
| RXRA - Distributed | 6.60 | 30.81 |
| TXRA - Distributed | 5.49 | 8.70 |
| DSRA - Centralized | 8.87 | 75.68 |
| RXRA - Centralized | 6.60 | 30.81 |
| TXRA - Centralized | 7.83 | 55.11 |
| Non-Reconfigurable | 5.05 | 0 |

2) Convergence Properties: Table V shows the average number of iterations required before convergence for the iterative Distributed DSRA and Distributed TXRA techniques. From the table it can be seen that convergence is achieved quickly, even in the DSRA case, where both transmitter and receiver were adapting their antenna configurations. It is noted that scenarios in which there was no convergence after 10 iterations were not included in the average shown in Table V. However, in both measurements and simulations more than 99% of the scenarios reached convergence before the 10th iteration.

Results for the Reconfigurable Printed Dipole Array

1) Sum Capacity Results: The network sum capacity CDFs for the Centralized selection schemes when the nodes are equipped with RPDAs appear in FIG. 10 for measurements and in FIG. 11 for simulations. The corresponding sum capacity CDFs when the configuration selection is performed in a Distributed manner appear in FIG. 12 for the measurements and in FIG. 13(d) for the simulations. In Table IV the expected sum capacities resulting from these CDFs are gathered together with the percentage increase in expected network sum capacity versus the non-reconfigurable case, where all the nodes were equipped with dipoles in the S-S configuration. As in the RCPA results, it can again be seen that the simulations underestimated the performance increase that was observed using the measurement results. However for the RPDA results, the relative performance between the configuration selection schemes is maintained between measurements and simulations, with the Centralized DSRA technique performing the best and the Distributed TXRA technique performing the worst of all techniques using reconfigurable antennas. By comparing these results with the RCPA results in the previous section, it can be seen that in both simulations and measurements, RPDAs provide a larger percentage increase in capacity than RCPAs. Furthermore, it can be seen that the worst to be expected as a percentage increase in sum capacity relative to non-reconfigurable antennas is 10% for the simulated TXRA technique and 30% for the measured TXRA technique. For the desirable Distributed RXRA scheme discussed above, there is a simulated increase in capacity of 24% and an increase of 31% in measured capacity relative to non-reconfigurable antennas.

TABLE IV

RPDA MEAN SUM NETWORK CAPACITY

| Selection Technique | Mean Sum Capacity (bps/Hz) | % Increase vs. Non-Reconfigurable |
|---|---|---|
| Simulations | | |
| DSRA - Distributed | 6.83 | 30.40 |
| RXRA - Distributed | 6.51 | 24.38 |
| TXRA - Distributed | 5.78 | 10.31 |
| DSRA - Centralized | 7.91 | 51.04 |
| RXRA - Centralized | 6.51 | 24.38 |
| TXRA - Centralized | 6.85 | 30.79 |
| Non-Reconfigurable | 5.23 | 0 |
| Measurements | | |
| DSRA - Distributed | 8.00 | 81.42 |
| RXRA - Distributed | 6.48 | 46.85 |
| TXRA - Distributed | 5.77 | 30.71 |
| DSRA - Centralized | 9.83 | 122.76 |
| RXRA - Centralized | 6.48 | 46.85 |
| RXRA - Centralized | 7.48 | 69.42 |
| Non-Reconfigurable | 4.41 | 0 |

TABLE V

AVERAGE NUMBER OF ITERATIONS BEFORE CONVERGENCE

| Antenna | Selection Technique | Simulations | Measurements |
|---|---|---|---|
| RCPA | DSRA - Distributed | 2.1 | 1.9 |
| RCPA | TXRA - Distributed | 1.7 | 1.2 |
| RPDA | DSRA - Distributed | 2.5 | 3.0 |
| RPDA | RXRA - Distributed | 2.0 | 2.3 |

2) Convergence Properties: The two iterative configuration selection schemes using RPDAs needed on average more iterations before convergence than the RCPA case, as shown in Table V. This longer convergence time can be attributed to the fact that RPDAs have more configurations to choose from than the RCPAs. The greater number of configurations to choose from also increased the number of scenarios in which there was no convergence after 10 iterations. In particular, for the measurement data, in the Distributed DSRA case, 26% of the scenarios did not converge before 10 iterations. Similarly, in the Distributed TXRA case, 7% of the scenarios did not converge before 10 iterations. While it would certainly have been possible to continue the iterative process until convergence was achieved, the inventors chose to limit the number of iterations to 10 before stopping the configuration update process because a practical system would not have an indefinite amount of time for configuration selection before network information became outdated.

Comparing RCPA with RPDA

A direct comparison of the performance of the RPDA and the RCPA, when employed in an ad-hoc network shows that the performance of the RPDA is higher—both in percentage increase relative to non-reconfigurable architectures, and in absolute sum network capacity values. The performance of a reconfigurable antenna array should be a function of the following factors: i.) the number of configurations available, ii.) the pattern diversity between different configurations and, iii.) the relative efficiency between the different configurations. While the relative radiation efficiency between RPDA and RCPA is important, the normalization process described above effectively sets the efficiency of RPDA configuration S-S equal to RCPA configuration Mode 3. If this normalization had not been performed, a direct comparison between the two architectures would not have been possible, since RPDA efficiency is much higher than that of the RCPA.

The superior performance of the RPDA, as compared to the RCPA, can be explained by the fact that the RPDA has more configurations available (4 configurations per array as opposed to 2 for the RCPA) and that its configurations are closer to each other in terms of efficiency (i.e., RPDA efficiency varies from 84% to 48% as opposed to the RCPA where the efficiency varies from 21% to 5%). On the other hand, the RCPA does have an advantage in that the radiation patterns of all available configurations show very low correlation (Table II(C)).

Effect of the Number of Configurations

In order to better analyze the effects of the number of available configurations, the sum network capacity was calculated for the case where the RPDAs were only allowed to switch between the S-S and the L-L configurations. In this case, the inventors were able to gain insight into the importance of having a large number of array configurations. In this situation, the RPDA has as many configuration settings as the RCPA, but with radiation patterns that are highly correlated (Table I(C)). Comparing Table VI with Table IV it can be seen that the percentage capacity increase relative to the non-reconfigurable case was almost halved for both measurements and simulations when the RPDA was restricted in switching only between the S-S and L-L configurations. These results highlight the importance of having a large number of antenna configurations to switch between, even if these configurations have radiation patterns that are relatively highly correlated.

TABLE VI

MEAN SUM NETWORK CAPACITY - RPDA RESULTS USING SS AND LL CONFIGURATIONS

| Selection Technique | Mean Sum Capacity (bps/Hz) | % Increase vs. Non-Reconfigurable |
|---|---|---|
| Simulations | | |
| DSRA - Distributed | 5.93 | 13.3 |
| RXRA - Distributed | 5.84 | 11.58 |
| TXRA - Distributed | 5.38 | 2.76 |
| DSRA - Centralized | 6.60 | 26.06 |
| RXRA - Centralized | 5.84 | 11.58 |
| TXRX - Centralized | 6.04 | 15.31 |
| Non-Reconfigurable | 5.23 | 0 |
| Measurements | | |
| DSRA - Distributed | 6.41 | 45.23 |
| RXRA - Distributed | 5.50 | 24.70 |
| TXRA - Distributed | 5.33 | 20.73 |
| DSRA - Centralized | 7.3 | 65.37 |
| RXRA - Centralized | 5.50 | 24.70 |
| RXRA - Centralized | 6.23 | 41.06 |
| Non-Reconfigurable | 4.41 | 0 |

The RCPA performs better, in absolute numbers, than the RPDA when the RPDA is confined to using only 2 of the available configurations. This result holds true even though the radiation efficiency difference between S-S configuration and L-L configuration is smaller than the radiation efficiency difference between Modes 3 and 4 of the RCPA. This result is due to the smaller correlation that exists between Mode 3 and 4 patterns in the RCPA, as compared to the correlation between S-S and L-L patterns in the RPDA. The effect of uncorrelated patterns will be considered in more detail below.

Effect of Correlation Between the Patterns

A new normalization procedure is described below to isolate the effect of correlation between the radiation patterns in reconfigurable antennas. In particular, each antenna configuration was normalized separately, so that the maximum expected squared Frobenious norm between the channels with the same configuration combination would be the same. Thus, there are four normalization factors for the "reduced" RPDA discussed in the previous sub-section (i.e., one for (S-S)-(S-S), another for (S-S)-(L-L), etc). Similarly, there are four normalization factors for the RCPA (i.e., one for Mode 3-Mode 3, another for Mode 3-Mode 4, etc). In this way, the effects of radiation efficiency were removed, forcing all configuration combinations to "receive" the same power, while keeping the relative channel strengths of the different links in the topology. Mathematically, the normalization parameter for the case where the receiver was using configuration rx and the transmitter was using configuration tx was chosen such that:

$$\max_{l,i} E\{|H_{l_r c, i_t c}|_F^2\} = 4 \text{ for simulations and } \max_{l,i} E\left\{\sum_{s=1}^{52} |H_{l_r c, i_t c}|_F^2\right\} = 4 \circ 52$$

for measurements, with the expectation taken along the 40 points.

The RPDA performance was again considered for the case where only the S-S and the L-L configurations were used. In this way, the performance of two reconfigurable antenna array structures were compared, with each having 2 configurations available and with all the configurations having the same radiation efficiency. The only difference between the two structures is the correlation between the available configurations. The RCPA structure exhibits almost uncorrelated patterns (Table II(C)), while the RPDA configurations are highly correlated (Table I(C)). The calculated expected sum network capacities appear in Table VII.

TABLE VII

MEAN SUM CAPACITY FOR PATTERN NORMALIZED SEPARATELY WITH RPDA USING ONLY S-S AND L-L CONFIGURATIONS

| Selection Technique | RPDA Mean Sum Capacity (bps/Hz) | RCPA Mean Sum Capacity (bps/Hz) |
|---|---|---|
| Simulations | | |
| DSRA - Distributed | 6.43 | 7.13 |
| RXRA - Distributed | 6.01 | 6.07 |
| TXRA - Distributed | 5.54 | 5.91 |
| DSRA - Centralized | 6.85 | 8.05 |
| RXRA - Centralized | 6.01 | 6.07 |
| TXRA - Centralized | 5.97 | 6.84 |
| Non-Reconfigurable | 5.23 | 4.89 |
| Measurements | | |
| DSRA - Distributed | 6.42 | 8.12 |
| RXRA - Distributed | 5.51 | 6.80 |
| TXRA - Distributed | 5.35 | 6.12 |
| DSRA - Centralized | 7.31 | 9.17 |
| RXRA - Centralized | 5.51 | 6.80 |
| TXRA - Centralized | 6.23 | 7.52 |
| Non-Reconfigurable | 4.41 | 5.05 |

From this table, it can be seen that the less correlated patterns that the RCPA offers significantly improves the expected sum capacity. It can also be observed that the capacity values for the RPDA do not change much with this new normalization, unlike the RCPA values, whose mean sum capacity values are significantly improved by forcing both modes to receive the same power. These results show that uncorrelated radiation patterns, as well as the number of configurations and relative radiation efficiency, can be a mechanism through which reconfigurable antennas enhance ad-hoc networks.

VI. Software Implementation

Figure 14:
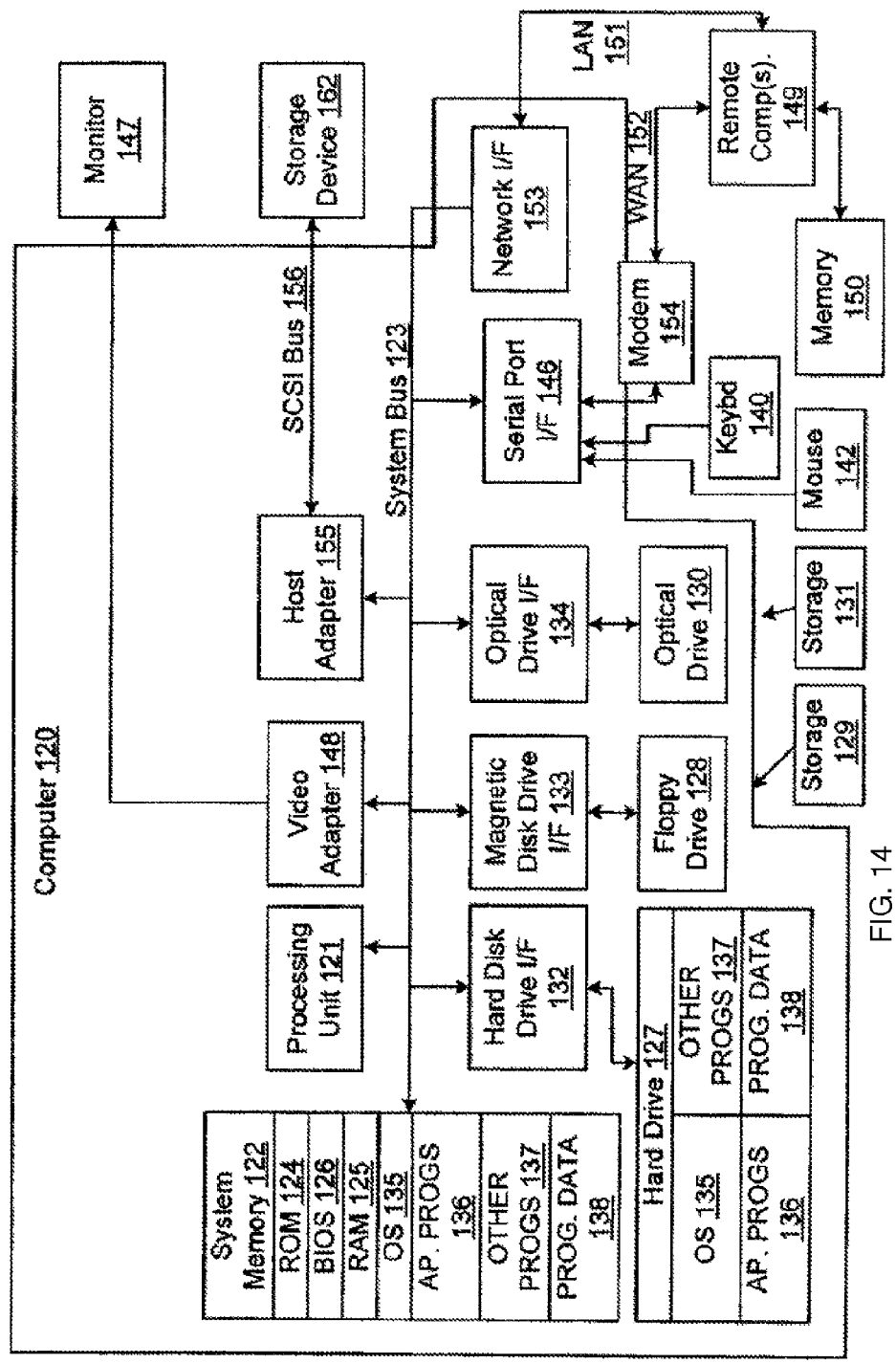
FIG. 14 illustrates a block diagram representing a general purpose computer system in which aspects of the present invention may be incorporated.

FIG. 14 and the following discussion are intended to provide a brief general description of a suitable computing environment in which the selection algorithms described above may be implemented. Although not required, the selection algorithms above may be implemented as computer-executable instructions, such as program modules, that are executed by a computer, such as a client workstation, server or personal computer, to implement methods of selecting antenna configurations, for example. Generally, computer-executable instructions include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

FIG. 14 is a block diagram representing a general purpose computer system in which aspects of the present invention may be incorporated. As shown, the exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video or versatile disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 14 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 14. The logical connections depicted in FIG. 14 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Computer 120 typically includes a variety of computer readable storage media. Computer readable storage media can be any available media that can be accessed by computer 120 and includes both volatile and nonvolatile media, removable and non-removable media By way of example, and not limitation, computer readable media may comprise computer storage media including both volatile and non-volatile, removable and non-removable media implemented in any method or technology for storage of information such as computer readable instructions, data structures, program modules or other data Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 120. Combinations of any of the above should also be included within the scope of computer readable media that may be used to store source code for implementing the selection algorithms described above when such source code is executed by a processor.

The invention is not intended to be limited to the variations and examples specifically mentioned, and accordingly reference should be made to the appended claims to assess the spirit and scope of the invention in which exclusive rights are claimed.

VII. Conclusions

The performance of two different reconfigurable antenna structures have been described when employed in a MIMO/MISO/SIMO ad-hoc network. The cases where reconfigurable antennas are employed at both link ends, as well as at either the receiver or transmitter have been described and the performance of these cases has been quantified with both a Centralized and Distributed configuration selection scheme. For all of the investigated techniques, the great capacity increases that can be expected by using reconfigurable antennas in a MIMO/MISO/SIMO ad-hoc network have been quantified. Insight into the design of reconfigurable antenna arrays has been provided by quantifying the effects of the number of configurations available, the correlation between different configurations, as well as the effect of radiation efficiency differences between the different configurations. The Distributed technique in which only the receiver is allowed to switch configurations (i.e., RXRA) has been shown to strike a good balance between sum network capacity increases and practical channel feedback and network information constraints.

What is claimed:

1. An ad-hoc network system, comprising:
at least one multi-element reconfigurable transmitter and/or at least one multi-element reconfigurable receiver where each said multi-element reconfigurable transmitter and receiver comprises multiple antennas where each antenna is capable of changing a radiation pattern and/or a polarization of a radiated field; and
a processor that processes software implementing a configuration selection method for selecting an antenna configuration for said at least one multi-element reconfigurable transmitter and/or receiver, where the antenna configuration is selected based on changes in interference in a transmission over a transmission link including the antenna being configured, a transmission rate of at least one transmitter, a received signal strength of at least one receiver, an error vector magnitude of at least one receiver, a channel matrix of at least one receiver, and/or a packet error rate of at least one of the receivers or transmitters of the transmission link,
wherein the software processed by the processor implements a centralized configuration selection process that has knowledge of part or all communication and interference channels in the ad-hoc network and selects the antenna configuration that optimizes the sum capacity of the ad-hoc network, the sum throughput of the ad-hoc network, and/or the error rate of the ad-hoc network, and wherein optimizing the sum capacity of the ad-hoc network, the sum throughput of the ad-hoc network, and/or the error rate of the ad-hoc network comprises solving the following optimization problem:

$$\max_c \left( \sum_{l \in L} \log_2 \left( \det \left( I + \frac{P_T}{\sigma^2 N_T} H_{l_{rc},l_{tc}} H^H_{l_{rc},l_{tc}} R_I^{-1} \right) \right) \right)$$

where c is an 1×2L vector that contains a configuration for all links l in the ad-hoc network, I denotes channel interference, $\sigma^2$ is noise power, $P_T/N_T$ represents diagonal elements of a diagonal matrix, $H_{l_{rc},l_{tc}}$ is a channel between a receiver of link l and a transmitter of link l for a receive configuration (rc) of link l and a transmit configuration (tc) of link l, $H^H_{l_{rc},l_{tc}}$ is a conjugate transpose of $H_{l_{rc},l_{tc}}$ and $R_I$ is an interference plus noise covariance matrix for link l.

2. A system as in claim 1, wherein the processor changes the antenna configuration of only a receiver in response to changes in interference in said transmission link.

3. A system as in claim 1, wherein the processor changes the antenna configuration of only a transmitter, wherein the antennas of different transmission links are allowed to change only after the interference level in said transmission link has adapted to a new antenna configuration at the transmitter of the transmission link.

4. A system as in claim 1, wherein the at least one multi-element reconfigurable transmitter or receiver comprises multiple-input-multiple-output (MIMO), single-input-multiple-output (SIMO) or multiple-input-single-output (MISO) transceivers.

5. A system as in claim 4, wherein at least one of the MIMO transceivers comprises a reconfigurable circular patch antenna.

6. A system as in claim 4, wherein at least one of the MIMO transceivers comprises a two-port reconfigurable leaky wave antenna.

7. A system as in claim 4, wherein at least one of the MIMO transceivers comprises a reconfigurable printed dipole array.

8. An ad-hoc network system, comprising:
at least one multi-element reconfigurable transmitter and/or at least one multi-element reconfigurable receiver where each said multi-element reconfigurable transmitter and receiver comprises multiple antennas where each antenna is capable of changing a radiation pattern and/or a polarization of a radiated field; and
a processor that processes software implementing a configuration selection method for selecting an antenna configuration for said at least one multi-element reconfigurable transmitter and/or receiver, where the antenna configuration is selected based on changes in interference in a transmission over a transmission link including the antenna being configured, a transmission rate of at least one transmitter, a received signal strength of at least one receiver, an error vector magnitude of at least one receiver, a channel matrix of at least one receiver, and/or a packet error rate of at least one of the receivers or transmitters of the transmission link,
wherein the software processed by the processor implements a distributed configuration selection process that selects the antenna configuration using link channel and interference noise plus a noise covariance matrix, a transmission rate, a received signal strength, an error vector magnitude, a channel matrix, and/or a packet error rate for the transmission link including the antenna being configured by optimizing the link capacity, link throughput, or the link packet error rate of said transmission link, and
wherein optimizing the link capacity, link throughput, or the link packet error rate of said transmission link comprises solving the following optimization problem:

$$\max_{rc,tc} \left( \log_2 \left( \det \left( I + \frac{P_T}{\sigma^2 N_T} H_{l_{rc},l_{tc}} H^H_{l_{rc},l_{tc}} R_I^{-1} \right) \right) \right)$$

where I denotes channel interference $\sigma^2$ is noise power $P_T/N_T$ represents diagonal elements of a diagonal matrix $H_{l_{rc},l_{tc}}$ is a channel between a receiver of link l and a transmitter of link l for a receive configuration (rc) of link l and a transmit configuration (tc) of link l, $H^H_{l_{rc},l_{tc}}$ is a conjugate transpose of $H_{l_{rc},l_{tc}}$, and $R_I$ is an interference plus noise covariance matrix for link l and depends on a transmit configuration of all other links and a receive configuration of link l.

9. A method for selecting the configuration of at least one multi-element reconfigurable transmitter and/or receiver in an ad-hoc network, comprising:

a processor selecting an antenna configuration for at least one multi-element reconfigurable transmitter and/or at least one multi-element reconfigurable receiver of a transmission link in said ad-hoc network where each said multi-element reconfigurable transmitter and receiver comprises multiple antennas where each antenna is capable of changing a radiation pattern and/or a polarization of a radiated field;

measuring or estimating interference, a channel matrix, a transmission rate, a received signal strength, an error vector magnitude, and/or an error packet rate of said transmission link; and selecting an antenna configuration for another transmission link in said ad-hoc network based on said measured or estimated interference, channel matrix, transmission rate, received signal strength, error vector magnitude, and/or error packet rate of said transmission link, wherein selecting the antenna configuration comprises implementing a centralized configuration selection process that has knowledge of part or all communication and interference channels in the ad-hoc network and selecting the antenna configuration that optimizes the sum capacity of the ad-hoc network, the sum throughput of the ad-hoc network, and/or the error rate of the ad-hoc network, and wherein optimizing the sum capacity of the ad-hoc network, the sum throughput of the ad-hoc network, and/or the error rate of the ad-hoc network comprises solving the following optimization problem:

$$\max_{c}\left(\sum_{l\in\mathcal{L}}\log_2\left(\det\left(I+\frac{P_T}{\sigma^2 N_T}H_{lrc,ltc}H^H_{lrc,ltc}R_l^{-1}\right)\right)\right)$$

where c is an 1×2L vector that contains a configuration for all links l in the ad-hoc network, I denotes channel interference $\sigma^2$ is noise power $P_T/N_T$ represents diagonal elements of a diagonal matrix, $H_{lrc,ltc}$ is a channel between a receiver of link l and a transmitter of link l for a receive configuration (rc) of link l and a transmit configuration (tc) of link l, $H^H_{lrc,ltc}$ is a conjugate transpose of $H_{lrc,ltc}$, and $R_l$ is an interference plus noise covariance matrix for link l.

10. A method as in claim 9, wherein said selecting comprises optimizing the link capacity, link throughput, or the link packet error rate of said transmission link.

11. A method as in claim 9, comprising repeating the measuring or estimating and selecting steps so as to allow transmission links in said ad-hoc network besides said transmission link to respond to new measured or estimated levels caused by a change in a transmit configuration of the transmitter of said transmission link.

12. A method as in claim 9, wherein the antenna configuration is selected only for a receiver in response to changes in the measured or estimated levels in said transmission link.

13. A method as in claim 9, wherein the antenna configuration is selected only for a transmitter, wherein the antennas of different transmission links are allowed to change only after the measured or estimated levels in said transmission link have adapted to a new antenna configuration at the transmitter of the transmission link.

14. A method as in claim 9, wherein the at least one multi-element reconfigurable transmitter or receiver comprises multiple-input-multiple-output (MIMO), single-input-multiple-output (SIMO) or multiple-input-single-output (MISO) transceivers.

15. A method as in claim 9, wherein an antenna configuration at only one end of said transmission link is changed and an end of said transmission link that is not changed is restricted to use the most radiation efficient antenna configuration at all times.

16. A method for selecting the configuration of at least one multi-element reconfigurable transmitter and/or receiver in an ad-hoc network, comprising:

a processor selecting an antenna configuration for at least one multi-element reconfigurable transmitter and/or at least one multi-element reconfigurable receiver of a transmission link in said ad-hoc network where each said multi-element reconfigurable transmitter and receiver comprises multiple antennas where each antenna is capable of changing a radiation pattern and/or a polarization of a radiated field;

measuring or estimating interference, a channel matrix, a transmission rate, a received signal strength, an error vector magnitude, and/or an error packet rate of said transmission link; and selecting an antenna configuration for another transmission link in said ad-hoc network based on said measured or estimated interference, channel matrix, transmission rate, received signal strength, error vector magnitude, and/or error packet rate of said transmission link, wherein selecting the antenna configuration comprises implementing a distributed configuration selection process that selects the antenna configuration using link channel and interference noise plus a noise covariance matrix, a transmission rate, a received signal strength, an error vector magnitude, a channel matrix, and/or a packet error rate for the transmission link including the antenna being configured by optimizing the link capacity, link throughput, or the link packet error rate of said transmission link, wherein optimizing the link capacity, link throughput, or the link packet error rate of said transmission link comprises solving the following optimization problem:

$$\max_{rc,tc}\left(\log_2\left(\det\left(I+\frac{P_T}{\sigma^2 N_T}H_{lrc,ltc}H^H_{lrc,ltc}R_l^{-1}\right)\right)\right)$$

where I denotes channel interference, $\sigma^2$ is noise power, $P_T/N_T$ represents diagonal elements of a diagonal matrix, $H_{lrc,ltc}$ is a channel between a receiver of link l and a transmitter of link l for a receive configuration (rc) of link l and a transmit configuration (tc) of link l, $H^H_{lrc,ltc}$ is a conjugate transpose of $H_{lrc,ltc}$ and $R_l$ is an interference plus noise covariance matrix for link l and depends on a transmit configuration of all other links and a receive configuration of link l.

* * * * *